(12) United States Patent
Kosslyn et al.

(10) Patent No.: US 9,785,316 B1
(45) Date of Patent: Oct. 10, 2017

(54) METHODS, SYSTEMS, AND MEDIA FOR PRESENTING MESSAGES

(71) Applicant: Google Inc., Mountain View, CA (US)

(72) Inventors: David Kosslyn, San Francisco, CA (US); Erica Morse, San Francisco, CA (US)

(73) Assignee: Google Inc., Mountain View, CA (US)

( * ) Notice: Subject to any disclaimer, the term of this patent is extended or adjusted under 35 U.S.C. 154(b) by 359 days.

(21) Appl. No.: 14/161,252

(22) Filed: Jan. 22, 2014

(51) Int. Cl.
*G06F 17/30* (2006.01)
*G06F 3/0484* (2013.01)
*H04L 12/58* (2006.01)

(52) U.S. Cl.
CPC ........... *G06F 3/0484* (2013.01); *H04L 51/04* (2013.01)

(58) Field of Classification Search
CPC .................. G06F 17/30873; G06F 21/6218
USPC ................... 715/744, 825, 841, 853
See application file for complete search history.

(56) References Cited

U.S. PATENT DOCUMENTS

| | | | | |
|---|---|---|---|---|
| 4,962,473 A * | 10/1990 | Crain | ...................... | G08B 25/14 340/539.2 |
| 6,327,586 B1 * | 12/2001 | Kisiel | ................ | G06F 17/30011 |
| 6,778,982 B1 * | 8/2004 | Knight | ................... | G06Q 10/10 707/737 |
| 7,546,544 B1 * | 6/2009 | Weber | ..................... | G06F 17/24 715/716 |
| 7,802,203 B2 * | 9/2010 | Danninger | ............ | G06F 3/0482 715/713 |
| 8,166,394 B1 * | 4/2012 | Melnicki | ............... | G06F 3/0482 715/200 |
| 8,463,764 B2 * | 6/2013 | Fujioka | ............. | G06F 17/30867 707/706 |
| 8,527,896 B2 * | 9/2013 | Matthews | ............. | G06F 3/0482 715/711 |
| 8,725,767 B1 * | 5/2014 | Wood | .................. | G06F 21/6218 707/781 |
| 8,726,159 B2 * | 5/2014 | Stallings | ............. | H04L 12/4625 715/716 |
| 8,812,423 B1 * | 8/2014 | Kurniawati | ......... | G06F 21/6218 706/47 |
| 8,896,556 B2 * | 11/2014 | Frazier | .................. | G06F 3/0482 345/173 |
| 2005/0071780 A1 * | 3/2005 | Muller | .................. | G06F 9/4443 715/825 |
| 2005/0076364 A1 * | 4/2005 | Dukes | .................... | G06Q 30/02 725/46 |
| 2005/0094798 A1 * | 5/2005 | Yacoub | ............... | H04M 3/5166 379/265.12 |
| 2005/0216834 A1 * | 9/2005 | Gu | ...................... | G06F 17/2247 715/248 |
| 2006/0059151 A1 * | 3/2006 | Martinez | ........... | G06F 17/30705 |

(Continued)

*Primary Examiner* — Daeho Song
(74) *Attorney, Agent, or Firm* — Byrne Poh LLP

(57) ABSTRACT

Methods, systems, and media for presenting messages are provided. In some embodiments, the method comprises: determining that a user interface is to be presented; determining at least one category of messages; determining, using a hardware processor, a plurality of individual messages within each of the at least one category of messages based at least in part on a user's expertise level; and causing the at least one category of messages and the plurality of individual messages within each of the at least one category of messages to be presented in response to the determination that the user interface is to be presented.

21 Claims, 6 Drawing Sheets

(56) References Cited

U.S. PATENT DOCUMENTS

| | | | |
|---|---|---|---|
| 2006/0101034 A1* | 5/2006 | Murphy | G06Q 10/10 |
| 2006/0253801 A1* | 11/2006 | Okaro | G06F 3/0482 715/810 |
| 2007/0033535 A1* | 2/2007 | Cornacchia | G06F 19/322 715/762 |
| 2007/0041542 A1* | 2/2007 | Schramm | H04M 3/42263 379/142.07 |
| 2007/0143281 A1* | 6/2007 | Smirin | G06F 17/30867 |
| 2007/0162857 A1* | 7/2007 | Weber | G06F 8/38 715/731 |
| 2007/0245260 A1* | 10/2007 | Koppert | G06F 3/04855 715/784 |
| 2007/0264956 A1* | 11/2007 | Bicker | G06Q 10/10 455/186.1 |
| 2008/0028031 A1* | 1/2008 | Bailey | G06Q 10/10 709/207 |
| 2008/0040387 A1* | 2/2008 | Schwartz | G06F 17/30867 |
| 2008/0229362 A1* | 9/2008 | White | H04N 5/44543 725/47 |
| 2008/0295008 A1* | 11/2008 | Kujda | G06F 3/0481 715/764 |
| 2008/0301734 A1* | 12/2008 | Goldeen | G06F 17/30058 725/44 |
| 2008/0307040 A1* | 12/2008 | So | G06Q 10/10 709/203 |
| 2009/0006976 A1* | 1/2009 | Im | H04N 1/00204 715/738 |
| 2009/0055755 A1* | 2/2009 | Hicks | G06F 17/3089 715/760 |
| 2009/0064057 A1* | 3/2009 | Bull | G06F 3/048 715/864 |
| 2009/0157677 A1* | 6/2009 | Beaver | G06F 17/30864 |
| 2010/0005413 A1* | 1/2010 | Liang | G09B 7/00 715/781 |
| 2010/0179876 A1* | 7/2010 | Holte | G06F 17/3089 705/14.54 |
| 2010/0191799 A1* | 7/2010 | Fiedorowicz | G06F 17/30873 709/203 |
| 2010/0325540 A1* | 12/2010 | Biazetti | G06F 8/316 715/708 |
| 2011/0163969 A1* | 7/2011 | Anzures | G06F 3/04883 345/173 |
| 2011/0210981 A1* | 9/2011 | Singh | G08B 13/1966 345/619 |
| 2011/0219084 A1* | 9/2011 | Borra | G06F 15/16 709/206 |
| 2011/0219312 A1* | 9/2011 | Kim | G06F 3/01 715/739 |
| 2011/0273540 A1* | 11/2011 | Lee | G06F 3/0346 348/51 |
| 2012/0036475 A1* | 2/2012 | Yoshitomi | G06F 3/0482 715/810 |
| 2012/0050267 A1* | 3/2012 | Seo | H04N 21/422 345/419 |
| 2012/0084280 A1* | 4/2012 | Bouzas | G06Q 50/01 707/723 |
| 2012/0089922 A1* | 4/2012 | Kennedy | G06F 9/4443 715/744 |
| 2012/0167000 A1* | 6/2012 | Ryu | H04N 21/4316 715/781 |
| 2012/0167005 A1* | 6/2012 | Matthews | G09G 5/14 715/799 |
| 2012/0173631 A1* | 7/2012 | Yoakum | H04M 3/53341 709/206 |
| 2012/0246725 A1* | 9/2012 | Osipkov | G06F 21/572 726/23 |
| 2012/0262494 A1* | 10/2012 | Choi | G06F 3/0481 345/672 |
| 2013/0019175 A1* | 1/2013 | Kotler | G06F 3/0482 715/728 |
| 2013/0019195 A1* | 1/2013 | Gates | G06F 3/048 715/771 |
| 2013/0226665 A1* | 8/2013 | Richardson | G06Q 30/02 705/7.32 |
| 2014/0075479 A1* | 3/2014 | Soto | H04N 5/44 725/43 |
| 2014/0123011 A1* | 5/2014 | Ahuja | G06F 3/048 715/719 |
| 2014/0229476 A1* | 8/2014 | Fouad | G06F 17/3071 707/729 |
| 2015/0206063 A1* | 7/2015 | Santero | G06N 5/00 706/12 |

\* cited by examiner

METHODS, SYSTEMS, AND MEDIA FOR PRESENTING MESSAGES

TECHNICAL FIELD

The disclosed subject matter relates to methods, systems, and media for presenting messages.

BACKGROUND

Providers of a product may want to convey news or information about the product to a user. For example, the provider may want to notify users that a new feature has been released or remind users about the existence of features they may have forgotten about. In some such instances, the provider can present users with messages conveying the news or information.

However, it can be difficult to present the messages in an organized and effective manner. The problem is magnified for products with a large number of users with different levels of expertise. For such products, it can be difficult to effectively present messages perceived to be relevant to the user and targeted at an expertise level corresponding to the user.

Accordingly, it is desirable to provide new methods, systems, and media for presenting messages.

SUMMARY

Methods, systems, and media for presenting messages are provided. In accordance with some embodiments of the disclosed subject matter, methods for presenting messages are provided, the methods comprising: determining that a user interface is to be presented; determining at least one category of messages; determining, using a hardware processor, a plurality of individual messages within each of the at least one category of messages based at least in part on a user's expertise level; and causing the at least one category of messages and the plurality of individual messages within each of the at least one category of messages to be presented in response to the determination that the user interface is to be presented.

In accordance with some embodiments of the disclosed subject matter, systems for presenting messages are provided, the systems comprising: a hardware processor that is configured to: determine that a user interface is to be presented; determine at least one category of messages; determine a plurality of individual messages within each of the at least one category of messages based at least in part on a user's expertise level; and cause the at least one category of messages and the plurality of individual messages within each of the at least one category of messages to be presented in response to the determination that the user interface is to be presented.

In accordance with some embodiments of the disclosed subject matter, non-transitory computer-readable media containing computer executable instructions that, when executed by a processor, cause the processor to perform a method for presenting messages are provided, the method comprising: determining that a user interface is to be presented; determining at least one category of messages; determining a plurality of individual messages within each of the at least one category of messages based at least in part on a user's expertise level; and causing the at least one category of messages and the plurality of individual messages within each of the at least one category of messages to be presented in response to the determination that the user interface is to be presented.

BRIEF DESCRIPTION OF THE DRAWINGS

Various objects, features, and advantages of the disclosed subject matter can be more fully appreciated with reference to the following detailed description of the disclosed subject matter when considered in connection with the following drawings, in which like reference numerals identify like elements.

DETAILED DESCRIPTION

Methods, systems, and media for presenting messages are provided.

In some embodiments, the messages can be presented within a global interface which is persistent across multiple pages. In some such embodiments, messages pertaining to one or more topics can be presented on a single panel, wherein each topic is associated with a section on the panel. In other embodiments, the messages can be presented within a contextual interface wherein only messages related to a topic associated with a currently open page are presented.

In accordance with some embodiments, the level of detail or type of detail presented in a particular message can be based on a user's expertise level. Additionally or alternatively, in some embodiments, the topic of a message to be presented can be determined based on a user's expertise level.

In some embodiments, one or more messages can be highlighted to indicate the message's relative priority. Additionally or alternatively, in some embodiments, messages relating to actions can include an indicator of whether the action has been completed.

Figure 1:
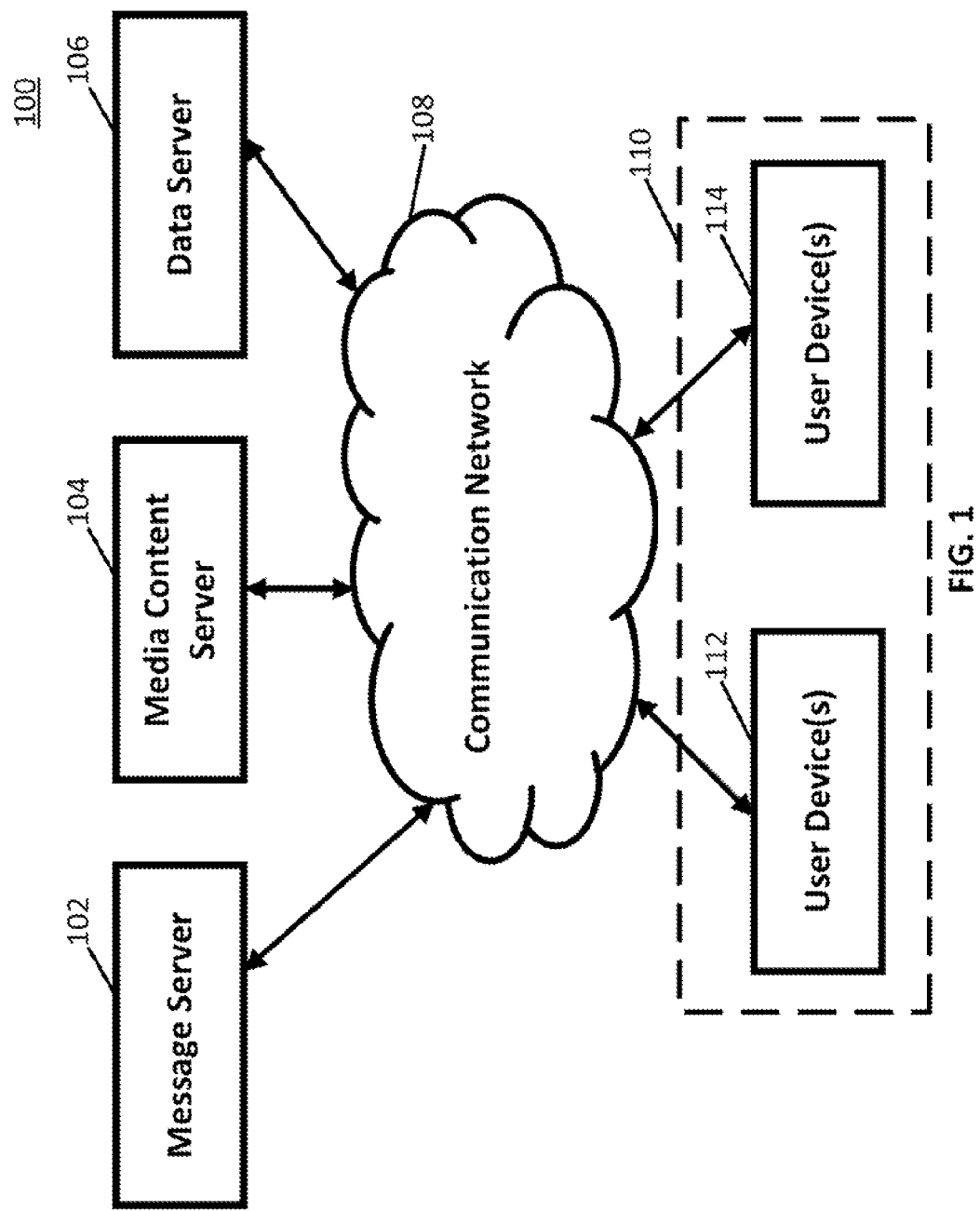
FIG. 1 shows a schematic diagram of an example of a system for presenting messages in accordance with some embodiments of the disclosed subject matter.

Turning to FIG. 1, an example 100 of hardware for presenting messages that can be used in accordance with some embodiments is shown. As illustrated, hardware 100 can include one or more servers, including message server 102, media content server 104, and data server 106, a communication network 108, and one or more user devices 110, such as user devices 112 and 114.

Message server 102 can be any suitable server for storing data and/or programs related to the appearance of messages, the creation of messages, the presentation of messages, and/or any other suitable information. For example, message server 102 can store information related to the appearance of messages, such as fonts, colors, and/or any other information related to the appearance of messages. As another example, message server 102 can use stored information related to the appearance of messages to create and present messages to a user device. In some embodiments, message server 102 can be omitted.

Media content server 104 can be any suitable server for storing media content and delivering the content to a user device 110 in some embodiments. For example, media content server 104 can be a server that streams media content to user device 110 via communication network 108. Media content provided by media content server 104 can be any suitable content, such as video content, audio content, television programs, movies, cartoons, sound effects, audiobooks, streaming live content (e.g., a streaming radio show, a live concert, and/or any other suitable type of streaming live content), electronic books, and/or any other suitable type of media content. Media content can be created and uploaded to media content server 104 by any suitable entity. In some embodiments, media content server 104 can be omitted.

Data server 106 can be any suitable server for storing data, programs, and/or any other suitable information. For example, in some embodiments, data server 106 can store the number of times a user has logged in to an account. As another example, data server 106 can store which messages or which topics of messages a user has read in the past. In some embodiments, data server 106 can be omitted.

Communication network 108 can be any suitable combination of one or more wired and/or wireless networks in some embodiments. For example, communication network 108 can include any one or more of the Internet, a mobile data network, a satellite network, a local area network, a wide area network, a telephone network, a cable television network, a WiFi network, a WiMax network, and/or any other suitable communication network.

User devices 110 can include any one or more user devices suitable for receiving messages. For example, in some embodiments, user devices 110 can include mobile devices, such as a mobile phone, a tablet computer, a laptop computer, a vehicle (e.g., a car, boat, airplane, or any other suitable vehicle) entertainment system, a portable media player, or any other suitable mobile device. As another example, in some embodiments, user devices 110 can include non-mobile devices such as a desktop computer, a set-top box, a television, a streaming media player, a game console, or any other suitable non-mobile device.

Although message server 102, media content server 104, and data server 106 are illustrated as separate devices, any one or more of these devices can be combined into one device in some embodiments. For example, in some embodiments, a single server can be used to directly communicate with a user device 110 (e.g., receiving requests from a user device, causing messages to be presented on a user device, and/or any other suitable communication). In some such embodiments, the single server can communicate with any other suitable external devices. Also, although only one each of message server 102, media content server 104, and data server 106 are shown in FIG. 1 to avoid over-complicating the figure, any suitable one or more of each device can be used in some embodiments.

Although two user devices 112 and 114 are shown in FIG. 1 to avoid over-complicating the figure, any suitable number of each of these devices, and any suitable types of these devices, can be used in some embodiments.

Figure 2:
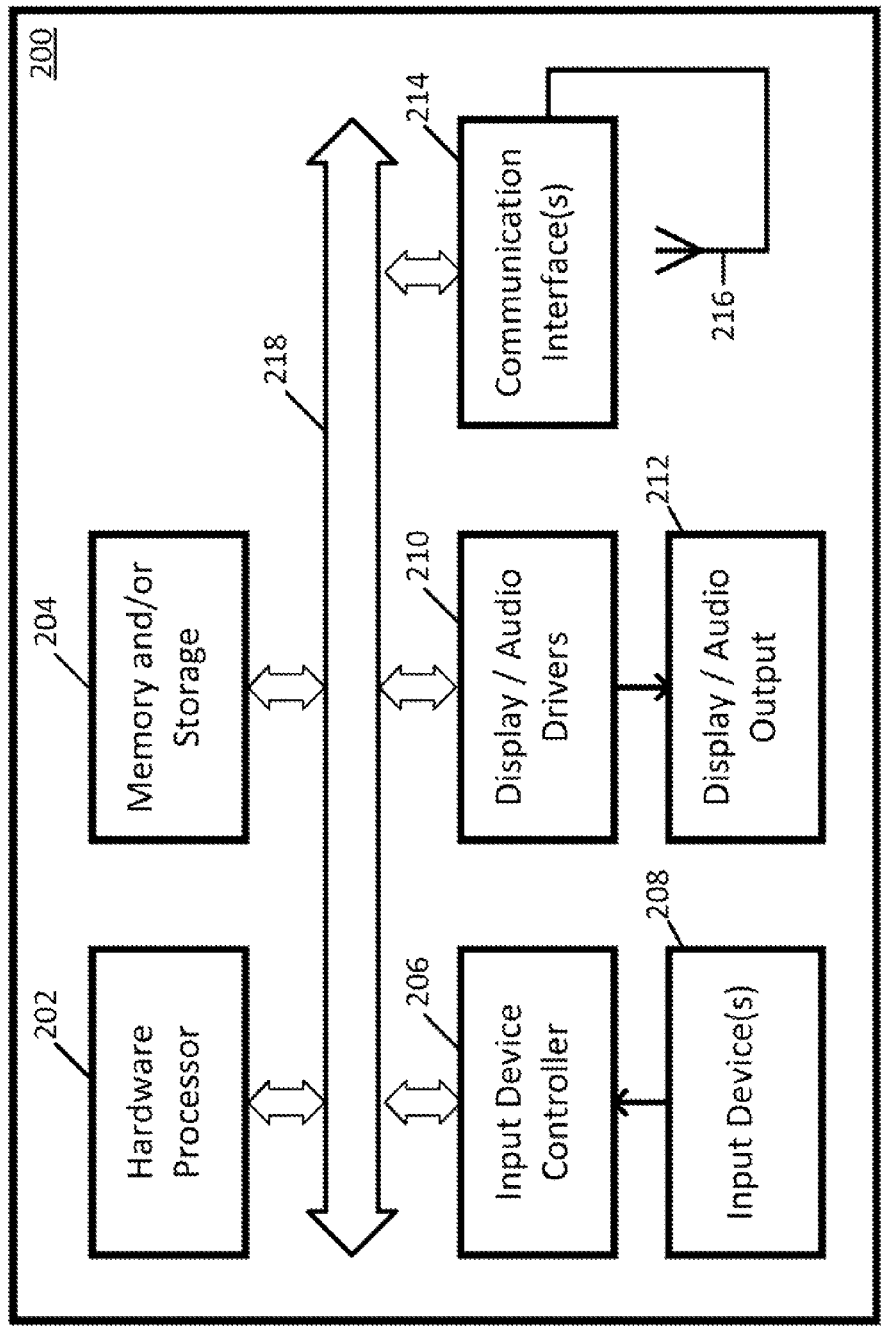
FIG. 2 shows an example of hardware that can be used in a server and/or a user device in accordance with some embodiments of the disclosed subject matter.

Message server 102, media content server 104, data server 106, and user devices 110 can be implemented using any suitable hardware in some embodiments. For example, in some embodiments, devices 102, 104, 106, and 110 can be implemented using any suitable general purpose computer or special purpose computer. For example, a mobile phone may be implemented using a special purpose computer. Any such general purpose computer or special purpose computer can include any suitable hardware. For example, as illustrated in example hardware 200 of FIG. 2, such hardware can include hardware processor 202, memory and/or storage 204, an input device controller 206, an input device 208, display/audio drivers 210, display and audio output circuitry 212, communication interface(s) 214, an antenna 216, and a bus 218.

Hardware processor 202 can include any suitable hardware processor, such as a microprocessor, a micro-controller, digital signal processor(s), dedicated logic, and/or any other suitable circuitry for controlling the functioning of a general purpose computer or a special purpose computer in some embodiments.

Memory and/or storage 204 can be any suitable memory and/or storage for storing programs, data, media content, and/or any other suitable information in some embodiments. For example, memory and/or storage 204 can include random access memory, read-only memory, flash memory, hard disk storage, optical media, and/or any other suitable memory.

Input device controller 206 can be any suitable circuitry for controlling and receiving input from one or more input devices 208 in some embodiments. For example, input device controller 206 can be circuitry for receiving input from a touch screen, from one or more buttons, from a voice recognition circuit, from a microphone, from a camera, from an optical sensor, from an accelerometer, from a temperature sensor, from a near field sensor, and/or any other type of input device.

Display/audio drivers 210 can be any suitable circuitry for controlling and driving output to one or more display/audio output circuitries 212 in some embodiments. For example, display/audio drivers 210 can be circuitry for driving an LCD display, a speaker, an LED, or any other type of output device.

Communication interface(s) 214 can be any suitable circuitry for interfacing with one or more communication networks, such as network 108 as shown in FIG. 1. For example, interface(s) 214 can include network interface card circuitry, wireless communication circuitry, and/or any other suitable type of communication network circuitry.

Antenna 216 can be any suitable one or more antennas for wirelessly communicating with a communication network in some embodiments. In some embodiments, antenna 216 can be omitted when not needed.

Bus 218 can be any suitable mechanism for communicating between two or more components 202, 204, 206, 210, and 214 in some embodiments.

Any other suitable components can be included in hardware 200 in accordance with some embodiments.

Figure 3:
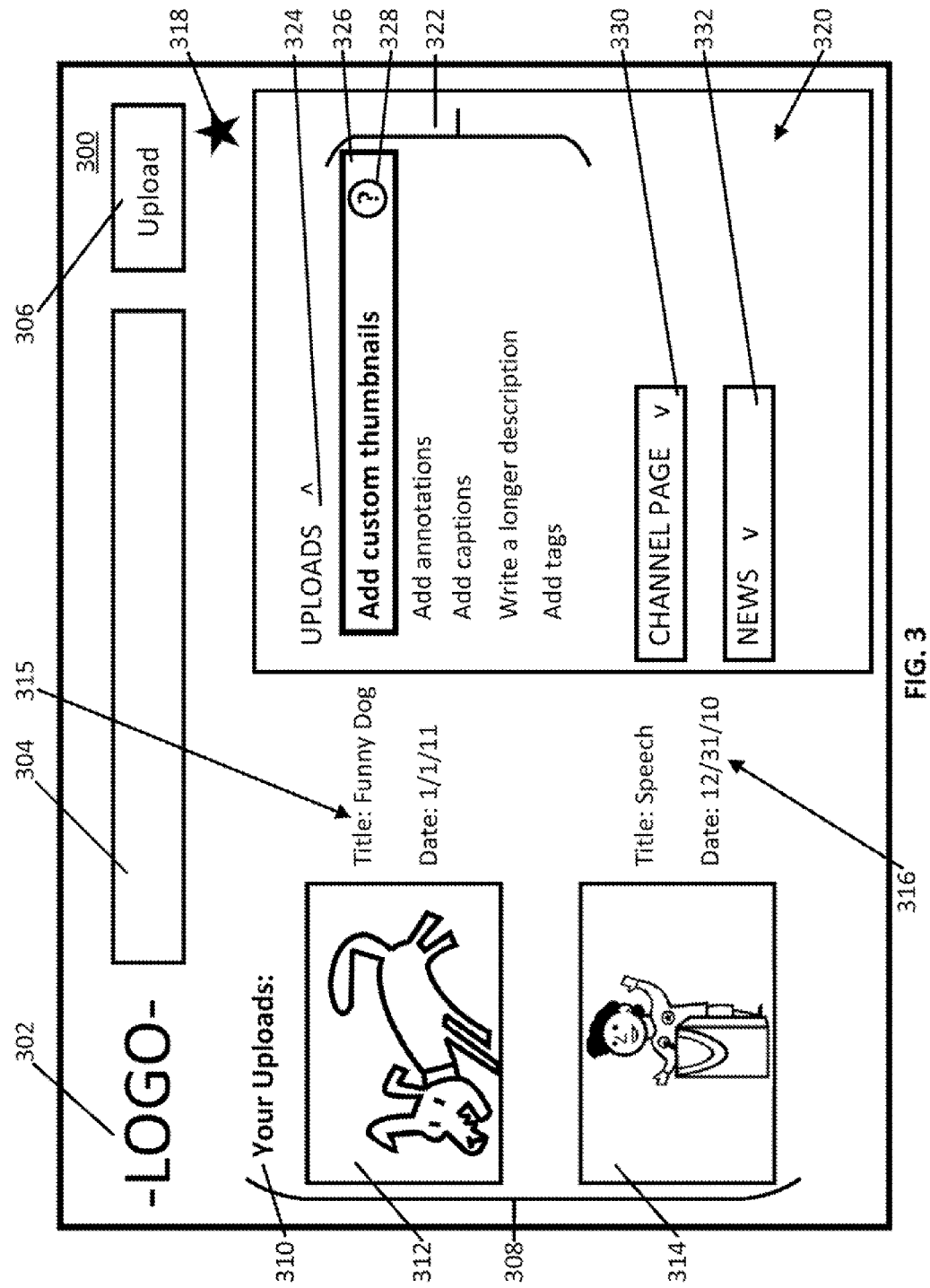
FIG. 3 shows an example of a user interface for presenting messages within a global interface in accordance with some embodiments of the disclosed subject matter.
Figure 4:
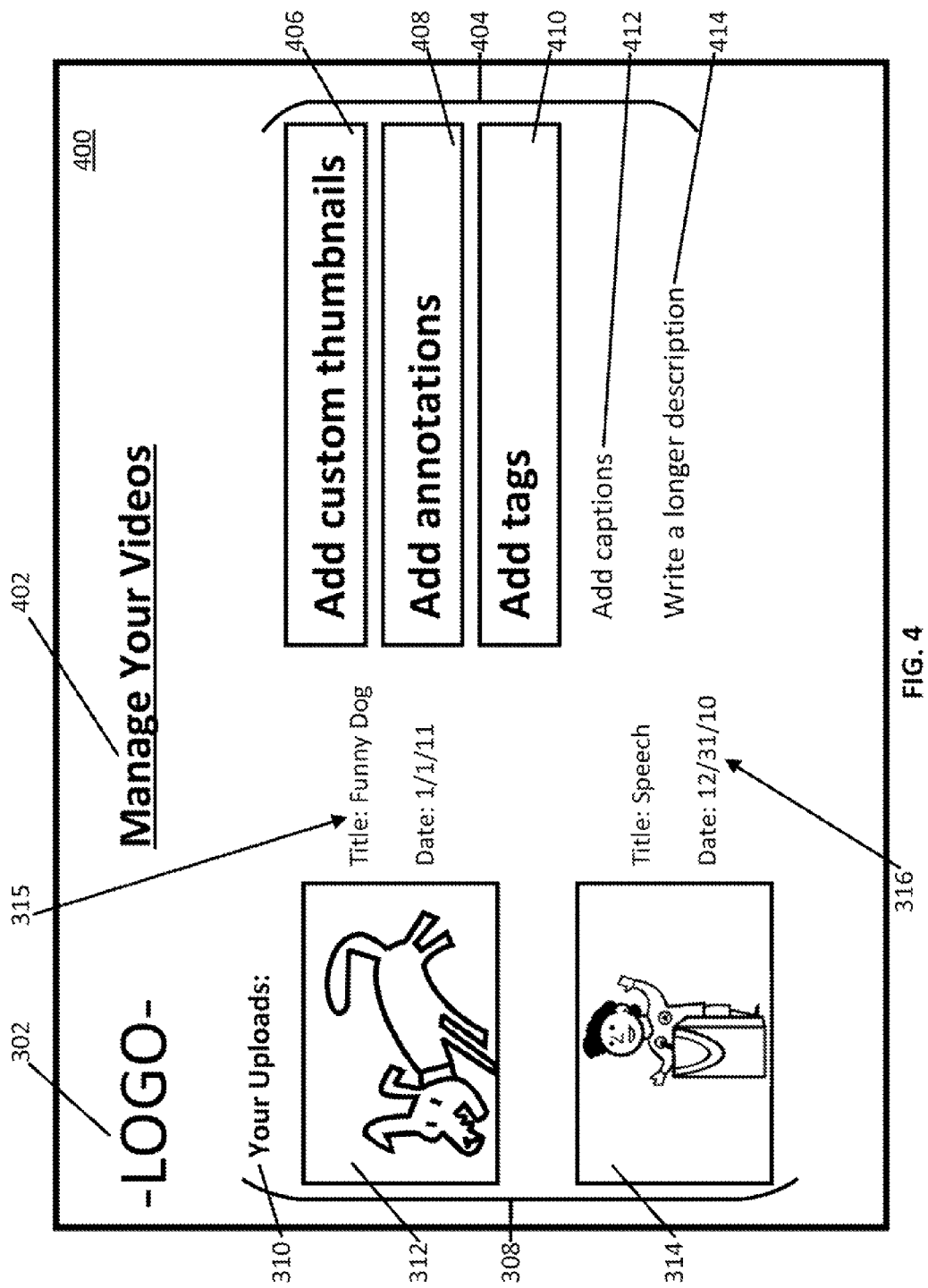
FIG. 4 shows an example of a user interface for presenting messages within a contextual interface in accordance with some embodiments of the disclosed subject matter.

FIGS. 3 and 4 show examples of user interfaces for presenting messages in accordance with some embodiments. In some embodiments, as shown in and described in connection with FIG. 3, messages can be presented using a global interface, which can persist across different pages and can be accessible from any of the different pages. The messages in the global interface can be grouped into different message categories, each of which can be presented on a single panel within sections corresponding to each message category. In contrast, in some embodiments, as shown in and described in connection with FIG. 4, messages can be presented using a contextual interface, wherein only messages relevant to a given page are presented while the page is open.

Turning to FIG. 3, an example 300 of a user interface for presenting messages is shown in accordance with some embodiments. As shown, in some embodiments, user interface 300 can include a provider logo 302, a data entry box 304, a data submission button 306, page content 308, new messages indicator 318, and message panel 320.

Logo 302 can be any suitable logo of any suitable provider of user interface 300 and can include any suitable text, graphics, images, video, or any other suitable content, in accordance with some embodiments. In some embodiments, logo 302 can be omitted.

Data entry box 304 can be used by user interface 300 to receive data from a user of user interface 300. Any suitable data can be entered in data entry box 304. For example, data entry box 304 can be used to receive a filename of an item of media content to be uploaded. Data entry box 304 can be any suitable mechanism for receiving data. For example, as shown in FIG. 3, data entry box 304 can be a text entry box. In some embodiments, data entry box 304 can include any suitable radio buttons, checkboxes, drop-down menus, push-buttons, and/or any other suitable user interface controls. In some embodiments, data entry box 304 can be omitted.

Data submission button 306 can be used by user interface 300 to submit data entered by a user. In some embodiments, the submitted data can include the data entered in data entry box 304. Data submission button 306 can be any suitable mechanism for indicating that data should be submitted. For example, as shown in FIG. 3, data submission button 306 can be a pushbutton. In some embodiments, data submission button 306 can be omitted.

Page content 308 can include any suitable content. For example, page content 308 can include indications of the media content uploaded by a user, indications of channels or categories of media content created by a user, information about the provider of user interface 300, and/or any other suitable content. As a more particular example, as shown in FIG. 3, page content 308 can include a text block 310, video thumbnails 312 and 314, and video information 315 and 316.

Text block 310 can be any suitable text related to page content 308. For example, text block 310 can identify the content of user interface 300. In some embodiments, text block 310 can be omitted.

Video thumbnails 312 and 314 can be used to show images related to uploaded media content. For example, as shown in FIG. 3, video thumbnails 312 and/or 314 can include images or graphics representative of corresponding videos. In some embodiments, video thumbnails 312 and/or 314 can include any suitable images, icons, graphics, animations, and/or any other suitable content. Although two video thumbnails are shown in FIG. 3, in some embodiments, any suitable number of video thumbnails can be included. In some embodiments, video thumbnails 312 and/or 314 can be omitted.

Video information 315 and 316 can be used to indicate any suitable information associated with an item of media content. For example, as shown in FIG. 3, information such as a title of the media content and/or a date of creation can be included in video information 315 and/or 316. Additionally or alternatively, information such as a name of a creator of the content, total number of views, keywords related to the subject matter, any suitable tags, availability of captions, and/or any other suitable information can be included in video information 315 and/or 316. Although two items of video information are shown in FIG. 3, any suitable number of items of video information can be included in some embodiments. In some embodiments, video information 315 and/or 316 can be omitted.

New messages indicator 318 can be used to indicate the presence of new messages. New messages indicator 318 can be any suitable mechanism(s) for indicating the presence of new messages. For example, as shown in FIG. 3, new messages indicator 318 can include an icon or image which can be presented when there are new messages. In some embodiments, new messages indicator 318 can always be present on user interface 300. In some such embodiments, new messages indicator 318 can change appearance when there are new messages available. As a more particular example, new messages indicator 318 can include an icon which changes color to indicate the presence of new messages. As another particular example, in some embodiments, a number within an icon of new messages indicator 318 can be used to indicate the number of new messages. In some embodiments, new messages indicator 318 can include presentation of any suitable sounds (e.g., a tone, a verbal statement that new messages are available, and/or any other sounds). Although only one new messages indicator is shown in FIG. 3, any suitable number of new messages indicators can be included in some embodiments. In some embodiments, new messages indicator 318 can be omitted.

Message panel 320 can be used as a container within which messages are organized and presented on user interface 300. Message panel 320 can be presented in any suitable manner. For example, in some embodiments, message panel 320 can slide onto user interface 300 from any suitable direction (e.g., from the right, from the bottom, or from any other direction). In some such embodiments, message panel 320 can initially be hidden and can appear (e.g., by sliding in from the right, bottom, top, or left of interface 300) when it is determined that message indicator 318 has been selected (e.g., by clicking with a mouse, by touching on a touchscreen, and/or any other suitable selection mechanism). As another example, in some embodiments, message panel 320 can be fully visible (e.g., at all times, when initially presented, and/or any other suitable times). In some embodiments, message panel 320 can be partially visible (e.g., with only a subset of the messages visible, with only a title visible, and/or any other suitable fraction of message panel 320). As yet another example, in some embodiments, message panel 320 can be fixed at a location on user interface 300. Additionally or alternatively, in some embodiments, message panel 320 can be dismissed or moved to a different location on user interface 300 by user input (e.g., from a keyboard, from a mouse, from a touchscreen, and/or any other source of user input).

Message panel 320 can include any suitable message categories which can be associated with various topics, including content uploads, channels a user has created, news about a product or the provider of user interface 300, and/or any other suitable topics. For example, as shown in FIG. 3, message panel 320 can include message categories 324, 330, and 332, corresponding to uploads, a channel page, and news, respectively. Message categories 324, 330, and 332 can be in any suitable format and can include any suitable functionality. For example, in some embodiments, message categories 324, 330, and 332 can include selection mechanisms which can allow messages within each message category to be displayed. Although three message categories are shown in FIG. 3, any suitable number of message categories can be included in some embodiments.

In some embodiments, a particular message category on message panel 320 can be expanded automatically at the time of presentation of message panel 320 to show messages associated with that message category. In some such embodiments, which message category is expanded by default can be determined based on the context of page content 308. In the particular example of FIG. 3, page content 308 relates to video uploads, and the message category corresponding to uploads on message panel 320 can therefore be expanded by default. In some such embodiments, although a particular category can be expanded by default, other categories can be expanded via user input (e.g., with a mouse click, and/or any other suitable type of user input). Selection of another category and/or message within another category can cause process 300 to present a page associated with the selected category and/or message.

Any suitable messages, and any suitable number of messages, can be listed under a particular message category. For example, as shown in FIG. 3, a set of messages 322 related to uploads (e.g., suggestions to add custom thumbnails, add annotations, add captions, write descriptions, add tags, and/or any other suitable messages) can be displayed on message panel 320 under message category 324, which relates to media content uploads.

An individual message 326 out of set of messages 322 can be highlighted to indicate user attention to the individual message. An individual message can be highlighted based on any suitable indication of user attention. For example, individual message 326 can be highlighted upon mouseover, and/or any other suitable indication of user attention. Individual message 326 can be highlighted in any suitable manner. For example, individual message 326 can include a bolded font and/or a box around the text, as shown in FIG. 3. As another example, individual message 326 can be presented in a different color than the other messages in set of messages 322.

In some embodiments, a question icon 328 can be presented along with individual message 326. Question icon 328 can be any suitable mechanism for allowing a user to indicate that they want to be presented with more information related to individual message 326. For example, question icon 328 can include a hyperlink to a page and/or pop-up window with more information related to individual message 326. Question icon 328 can include any suitable images, graphics, animations, and/or any other suitable content. In some embodiments, any suitable number of question icons (including none) can be presented.

Turning to FIG. 4, an example 400 of a user interface for presenting messages in a contextual interface is shown in accordance with some embodiments. As shown, in some embodiments, user interface 400 can include a title 402 and a set of messages 404.

Title 402 can be any suitable mechanism for indicating the contents of user interface 400. For example, as shown in FIG. 4, title 402 can include a text block which can state a title for a Web page displayed in user interface 400. In some embodiments, title 402 can include any suitable images, icons, graphics, videos, animations, and/or any other suitable content. In some embodiments, title 402 can be omitted.

Set of messages 404 can include any suitable messages, such as messages 406, 408, 410, 412, and 414, associated with a message category corresponding to the content presented in user interface 400. For example, if user interface 400 presents a Web page relating to videos a user has uploaded, as shown in FIG. 4, set of messages 404 can include messages with suggestions related to presenting the videos, managing the videos, advertising the videos, and/or any other suitable types of messages. In the specific example shown in FIG. 4, messages 406, 408, 410, 412, and 414 present suggestions to add custom thumbnails, add annotations, add tags, add captions, and write a longer description, respectively. Although five messages are shown in set of messages 404, any suitable number of messages can be presented in some embodiments.

In some embodiments, some messages out of set of messages 404 can be highlighted in a manner to suggest that those messages have higher priority than other messages. Messages can be highlighted in any suitable manner. As a particular example, as shown in FIG. 4, messages 406, 408, and 410 are presented in a larger and bolder font compared to messages 412 and 414. In some embodiments, different colors or different fonts can be used to highlight higher priority messages.

In some embodiments, messages relating to actions (e.g., messages suggesting a user add captions to a video, messages suggesting a user add descriptions to a video, and/or any other suitable messages relating to actions) can include a message indicating whether a user has performed the action. As a particular example, the message can include a check mark indicating that a user has performed the action. In some embodiments, multiple messages relating to actions can be grouped, and another message indicating progress on those actions can be presented. In some such embodiments, the progress message can be in any suitable format. For example, the progress message can include a scorecard, which can indicate how many of the actions the user has completed.

Display of and interaction with the user interfaces shown in and described in connection with FIGS. 3 and 4 can be executed with one or more components of hardware 200. For example, in some embodiments, hardware processor 202 on message server 102 can cause a user interface to be presented on display/audio output 212 (e.g., a monitor, a tablet computer screen, a mobile phone screen, and/or any other suitable display/audio output) of a user device 110 by directing display/audio drivers 210 on user device 110 to present the user interface on display/audio output 212. In some embodiments, hardware processor 202 can be on a user device 110. As another example, hardware processor 202 on message server 102 can receive input from a user interface by receiving data passed from input device controller 206 on a user device 110, which can receive input from input device 208 (e.g., a keyboard, a mouse, a touch screen, a microphone, and/or any other suitable input device) on user device 110.

Figure 5:
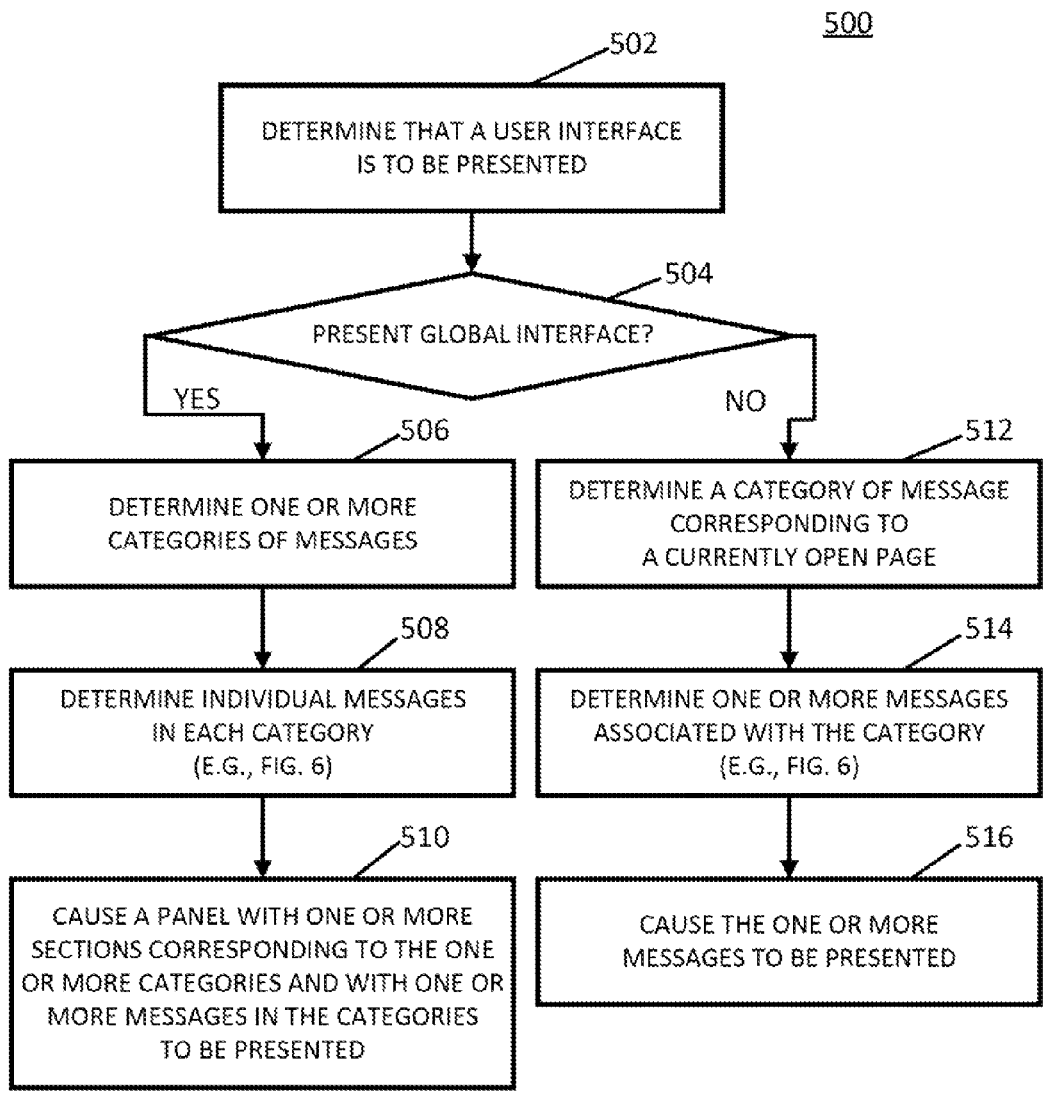
FIG. 5 shows a flowchart of an example of a process for presenting messages in accordance with some embodiments of the disclosed subject matter.

Turning to FIG. 5, a flow chart of an illustrative process 500 for presenting messages in accordance with some embodiments is shown.

As illustrated, process 500 can begin by determining whether a user interface is to be presented at 502. The determination can be made in any suitable manner. For example, process 500 can receive a request to present a user interface from any suitable source. As a more particular example, a request can be generated when it is determined that a particular Web page has been navigated to (e.g., the home page of a particular product or provider of a product, and/or any other suitable page). As another example, a request can be generated by a hardware processor when it is determined that a user has logged into the user's account.

Process 500 can determine whether a global interface should be presented at 504. This determination can be made in any suitable manner. For example, in some embodiments, process 500 can access a data structure indicating the type of message interface that should be presented.

If, at 504, it is determined that a global interface should be presented, process 500 can determine one or more categories of messages to present at 506. Any suitable number of categories of messages can be determined. The categories of messages can be determined in any suitable manner. For example, process 500 can determine the categories of messages by accessing a table with a list of categories. In some embodiments, the categories of messages can be limited based on information related to which categories a user has shown interest in in the past. Example categories of messages can include uploads, channels, news, account settings, and/or any other suitable categories of messages.

Process 500 can then determine individual messages to be presented within each category of message at 508. Any suitable number of individual messages can be determined. Individual messages can include any suitable information and can include any suitable level of detail. For example, in some embodiments, the information contained in the individual messages can be tailored to a particular user based on prior interest and/or expertise level. A more particular example of a process for determining individual messages based on expertise level is shown in and described in connection with FIG. 6.

After determining the categories of messages and the individual messages within each category, process 500 can cause a panel containing the categories and the messages to be presented in a user interface at 510. The panel can contain one or more sections corresponding to the categories of messages determined at 506, for example, as shown in and described in connection with FIG. 4. The panel can be presented in any suitable manner. For example, in some embodiments, animation can be used to move the panel into the user interface. In some such embodiments, the panel can move into the user interface from any direction. Additionally or alternatively, in some embodiments, process 500 can cause new messages indicator 318 to appear and/or to change appearances, as shown in and described above in connection with FIG. 3.

If, at 504, it is determined that a global interface should not be presented, process 500 can determine one or more categories of messages corresponding to a currently open page at 512. Any suitable number of categories can be determined. For example, if it is determined that the currently open page relates to media content uploaded by a user, process 500 can determine the category corresponds to uploads. Process 500 can determine the categories of messages in any suitable manner. For example, process 500 can use a look-up table which maps a type of page to one or more categories of messages. Example categories can include uploads, channels, news, account settings, and/or any other suitable category corresponding to a type of page.

Process 500 can then determine one or more messages associated with the category at 514. Any suitable number of messages can be determined. As a more particular example, messages corresponding to a category of uploads can include messages suggesting a user add captions, add tags, add descriptions, and/or any other suitable messages. As another particular example, messages corresponding to a category of news can include messages announcing new product features, messages announcing product features that will soon expire, and/or any other suitable messages relating to news. The one or more messages can be determined in any suitable manner. For example, process 500 can access a table which lists one or more messages corresponding to different categories.

Process 500 can then cause the one or more messages corresponding to the category associated with the currently open page to be presented at 516. The messages can be presented in any suitable manner. For example, the messages can be presented grouped together on a user interface, as shown in and described in connection with FIG. 4. In some embodiments, some messages can be highlighted to indicate a higher priority, as shown in and described in connection with FIG. 4.

Figure 6:
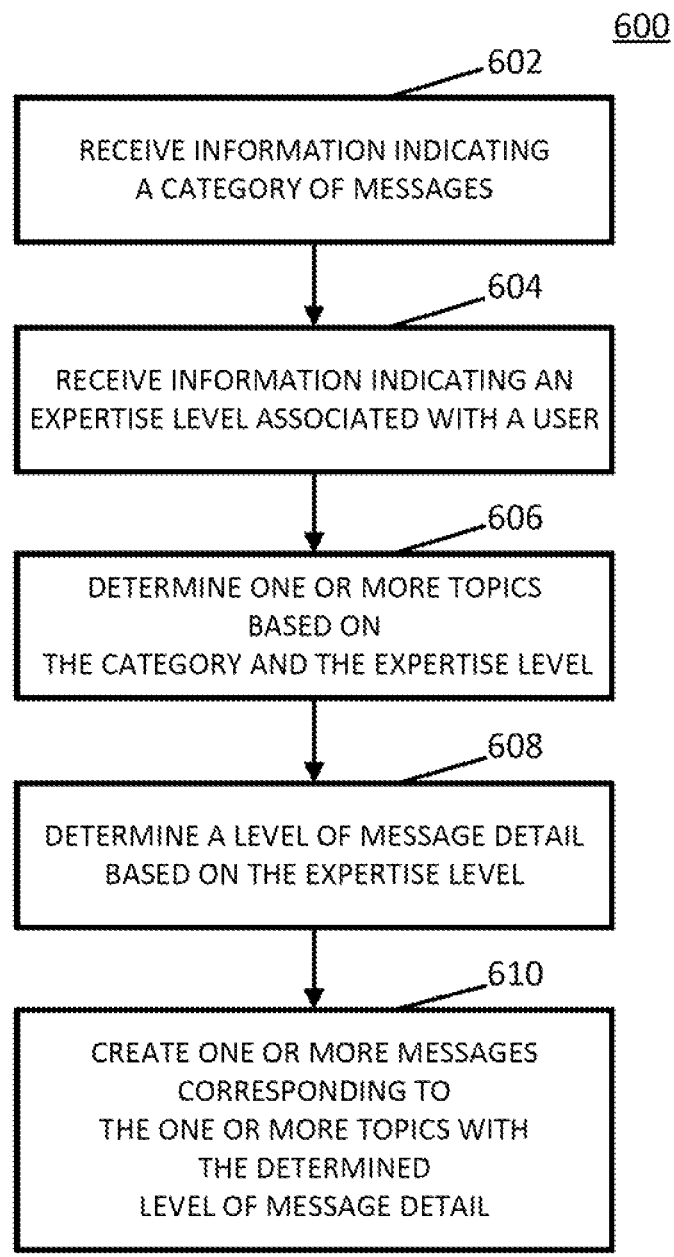
FIG. 6 shows a flow chart of an example of a process for creating messages based on a user's expertise level in accordance with some embodiments of the disclosed subject matter.

Turning to FIG. 6, an example 600 of a process for determining and creating one or more messages based on information about a user's expertise level is illustrated in accordance with some embodiments.

At 602, process 600 can begin by receiving information indicating a category of messages corresponding to the messages which should be created. The information can be generated and transmitted by any suitable source. For example, in some embodiments, the information can be generated and transmitted by process 500, for example, at block 506 and/or block 512. As described above in connection with FIG. 5, example categories can include uploads, channels, news, account settings, and/or any other suitable categories.

Process 600 can receive information indicating an expertise level associated with a user at 604. The information can be based on any suitable data and can include any suitable level of detail. For example, in instances where a user consents to the use of the user's prior interaction with messages or the user's prior interaction with a product, the information can be based on the user's prior interactions. As a more particular example, the information can be based on which messages or which types of messages a user has looked at or interacted with in the past. As another particular example, the information can be based on how many times the user has used the product or based on how long the user has used the product (e.g., for a week, a month, a year, or any other suitable time period).

Process 600 can determine one or more topics based on the category and the expertise level at 606. The topics can be determined based on any suitable information. For example, process 600 can determine based on the information received in blocks 602 and 604 which topics are suitable for a currently open page or which topics are suitable for users of a particular expertise level. As a more particular example, process 600 can determine that a topic related to an introduction to features of a product is suitable if the category is general information and if it is determined that the user is at an introductory expertise level. As another particular example, process 600 can determine that a topic related to increasing traffic to a user's videos is suitable if the category is media content uploads and if it is determined that the user is at an advanced expertise level. The topics can be determined in any suitable manner. For example, process 600 can access a table which maps different categories and different expertise levels to suitable topics.

Process 600 can determine a level of message detail based on the determined expertise level at 608. For example, a message directed to a user at an introductory expertise level can include information indicating why the message is important, links to help pages, and/or any other suitable information. Conversely, a message directed to a user at an advanced expertise level can include less detail. The level of message detail can be determined in any suitable manner. For example, process 600 can access a table which stores different versions of a single message for different expertise levels.

Process 600 can create one or more messages corresponding to the one or more topics with the determined level of message detail at 610. The created messages can include any suitable content relevant to the topic(s) determined at block 606. As a particular example, if the topic is an introduction to the features of the product, a created message can suggest that a user take a virtual tour of the product. In some embodiments, the appearance of the messages can indicate any additional information with any suitable mechanism. For example, process 600 can highlight one or more of the messages to indicate relative priority. As another example, in some embodiments, process 600 can introduce hyperlinks into a message which can direct a user to additional information related to the message.

Components of hardware 200 can be used to execute the blocks of processes 500 and 600. For example, hardware processor 202 on message server 102 can determine a category of message to present based on which page is currently open on a user device 110. As another example, message server 102 can receive information about a user's expertise level from data server 106 via communication network 108. As yet another example, hardware processor 202 on message server 102 can determine whether or not messages should be presented in a global interface by accessing information stored in memory and/or storage 204.

It should be understood that at least some of the above described blocks of the processes of FIGS. 5 and 6 can be executed or performed in any order or sequence not limited to the order and sequence shown in and described in the figures. Also, some of the above blocks of FIGS. 5 and 6 can be executed or performed substantially simultaneously where appropriate or in parallel to reduce latency and processing times. Additionally or alternatively, some of the above described blocks of processes of FIGS. 5 and 6 can be omitted.

In some embodiments, any suitable computer readable media can be used for storing instructions for performing the functions and/or processes herein. For example, in some embodiments, computer readable media can be transitory or non-transitory. For example, non-transitory computer readable media can include media such as magnetic media (such as hard disks, floppy disks, and/or any other suitable magnetic media), optical media (such as compact discs, digital video discs, Blu-ray discs, and/or any other suitable optical media), semiconductor media (such as flash memory, electrically programmable read-only memory (EPROM), electrically erasable programmable read-only memory (EEPROM), and/or any other suitable semiconductor media), any suitable media that is not fleeting or devoid of any semblance of permanence during transmission, and/or any suitable tangible media. As another example, transitory computer readable media can include signals on networks, in wires, conductors, optical fibers, circuits, any suitable media that is fleeting and devoid of any semblance of permanence during transmission, and/or any suitable intangible media.

In situations in which the systems described here collect personal information about users, or make use of personal information, the users may be provided with an opportunity to control whether programs or features collect user information (e.g., information about a user's social network, social actions or activities, profession, a user's preferences, or a user's current location). In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by a content server.

Although the invention has been described and illustrated in the foregoing illustrative embodiments, it is understood that the present disclosure has been made only by way of example, and that numerous changes in the details of implementation of the invention can be made without departing from the spirit and scope of the invention, which is limited only by the claims that follow. Features of the disclosed embodiments can be combined and rearranged in various ways.

What is claimed is:

1. A method for presenting messages, comprising:
causing content to be presented in a first portion of a user interface;
determining at least one category of messages based on the content being presented in the first portion of the user interface;
determining, using a hardware processor, a plurality of individual messages within each of the at least one category of messages based at least in part on a user's expertise level, wherein each of the plurality of individual messages is based on the content being presented in the first portion of the user interface;
in response to determining the at least one category of messages based on the content being presented in the first portion of the user interface and in response to determining the plurality of individual messages based on the user's expertise level, causing the at least one category of messages and the plurality of individual messages within each of the at least one category of messages to be presented in a second portion of the user interface concurrently with the content being presented in the first portion of the user interface; and
causing an indicator that the plurality of individual messages are new to be presented in the second portion of the user interface according to the content being presented in the first portion of the user interface.

2. The method of claim 1, wherein the at least one category of messages and the plurality of individual messages are presented within a panel in the second portion of the user interface with a plurality of sections corresponding to the at least one category of messages.

3. The method of claim 2, wherein a section of the plurality of sections is expanded automatically based at least in part on a currently open page.

4. The method of claim 1, wherein the at least one category of messages is based at least in part on a currently open page.

5. The method of claim 1, wherein a level of detail associated with each of the plurality of individual messages is determined based on the user's expertise level.

6. The method of claim 1, wherein the user's expertise level is based at least in part on how many times the user has used a product.

7. The method of claim 1, wherein at least one of the plurality of individual messages indicates an action to be performed by the user relating to the content being presented in the first portion of the user interface, and wherein the at least one of the plurality of individual messages is presented in association with an indication of whether the user has completed the action.

8. A system for presenting messages, the system comprising:
a hardware processor that is configured to:
cause content to be presented in a first portion of a user;
determine at least one category of messages based on the content being presented in the first portion of the user interface;
determine a plurality of individual messages within each of the at least one category of messages based at least in part on a user's expertise level, wherein each of the plurality of individual messages is based on the content being presented in the first portion of the user interface;
in response to determining the at least one category of messages based on the content being presented in the first portion of the user interface and in response to determining the plurality of individual messages based on the user's expertise level, cause the at least one category of messages and the plurality of individual messages within each of the at least one category of messages to be presented in a second portion of the user interface concurrently with the content being presented in the first portion of the user interface; and
cause an indicator that the plurality of individual messages are new to be presented in the second portion of the user interface according to the content being presented in the first portion of the user interface.

9. The system of claim 8, wherein the at least one category of messages and the plurality of individual messages are presented within a panel in the second portion of the user interface with a plurality of sections corresponding to the at least one category of messages.

10. The system of claim 9, wherein a section of the plurality of sections is expanded automatically based at least in part on a currently open page.

11. The system of claim 8, wherein the at least one category of messages is based at least in part on a currently open page.

12. The system of claim 8, wherein a level of detail associated with each of the plurality of individual messages is determined based on the user's expertise level.

13. The system of claim 8, wherein the user's expertise level is based at least in part on how many times the user has used a product.

14. The system of claim 8, wherein at least one of the plurality of individual messages indicates an action to be performed by the user relating to the content being presented in the first portion of the user interface, and wherein the at least one of the plurality of individual messages is presented in association with an indication of whether the user has completed the action.

15. A non-transitory computer-readable medium containing computer executable instructions that, when executed by a processor, cause the processor to be configured to:
cause content to be presented in a first portion of a user interface;
determine at least one category of messages based on the content being presented in the first portion of the user interface;
determine a plurality of individual messages within each of the at least one category of messages based at least in part on a user's expertise level, wherein each of the plurality of individual messages is based on the content being presented in the first portion of the user interface;
in response to determining the at least one category of messages based on the content being presented in the first portion of the user interface and in response to determining the plurality of individual messages based on the user's expertise level, cause the at least one category of messages and the plurality of individual messages within each of the at least one category of messages to be presented in a second portion of the user interface concurrently with the content being presented in the first portion of the user interface; and
cause an indicator that the plurality of individual messages are new to be presented in the second portion of the user interface according to the content being presented in the first portion of the user interface.

16. The non-transitory computer-readable medium of claim 15, wherein the at least one category of messages and the plurality of individual messages are presented within a panel in the second portion of the user interface with a plurality of sections corresponding to the at least one category of messages.

17. The non-transitory computer-readable medium of claim 16, wherein a section of the plurality of sections is expanded automatically based at least in part on a currently open page.

18. The non-transitory computer-readable medium of claim 15, wherein the at least one category of messages is based at least in part on a currently open page.

19. The non-transitory computer-readable medium of claim 15, wherein a level of detail associated with each of the plurality of individual messages is determined based on the user's expertise level.

20. The non-transitory computer-readable medium of claim 15, wherein the user's expertise level is based at least in part on how many times the user has used a product.

21. The non-transitory computer-readable medium of claim 15, wherein at least one of the plurality of individual messages indicates an action to be performed by the user relating to the content being presented in the first portion of the user interface, and wherein the at least one of the plurality of individual messages is presented in association with an indication of whether the user has completed the action.

* * * * *